United States Patent [19]
Bezzerides

[11] 4,131,163
[45] Dec. 26, 1978

[54] STUBBLE ERADICATING IMPLEMENT

[76] Inventor: Paul A. Bezzerides, 14092 Avenue 416, P.O. Box 211, Orosi, Calif. 93647

[21] Appl. No.: 790,332

[22] Filed: Apr. 25, 1977

[51] Int. Cl.² .............................................. A01B 35/18
[52] U.S. Cl. .................................... 172/145; 172/149; 172/181
[58] Field of Search ............... 172/145, 149, 175, 180, 172/181, 174, 179, 642, 146, 148, 151, 574, 176, 701, 685, 687, 686

[56] References Cited

U.S. PATENT DOCUMENTS

| | | | |
|---|---|---|---|
| 1,031,546 | 7/1912 | Hamilton | 172/181 |
| 1,557,109 | 10/1925 | Vandeberg | 172/574 |
| 2,546,461 | 3/1951 | Lewis | 172/574 |
| 3,252,522 | 5/1966 | Taylor | 172/701 X |
| 3,601,202 | 8/1971 | Steffe | 172/574 |
| 4,015,667 | 4/1977 | Ruozi | 172/181 |
| 4,033,270 | 7/1977 | Bezzerides | 172/574 |

FOREIGN PATENT DOCUMENTS 65716 11/1955 France ....................................... 172/574

Primary Examiner—Richard J. Johnson
Attorney, Agent, or Firm—Huebner & Worrel

[57] ABSTRACT

A stubble eradicating implement adapted for earth traversing movement along a ridge having stubble and other debris thereon and having furrows on opposite sides of the ridge, the implement having a frame, guide wheels mounted on the frame; a pair of concavo-convex disk blades mounted on the frame in fore and aft spaced relation rearwardly of the guide wheels for free rotation about individual axes lying in vertical planes oppositely forwardly convergent with the ridge and oppositely forwardly inclined in their respective planes so that the concave faces of the disks are forwardly and upwardly disposed with the disk blades overlapping in earth engagement centrally of the ridge to discharge stubble and debris from the ridge into adjacent furrows, a first furrowing shovel mounted on the frame rearwardly of the disk blades in alignment with the ridge to discharge soil onto stubble and debris in the furrows, a compacting roller mounted on the frame rearwardly of each of the first shovels in alignment with their respective furrows to compact soil on top of the stubble and debris and a second furrowing shovel mounted in the frame rearwardly of each of the rollers in alignment with the first furrowing shovel to complete the formation of a furrow where the ridge initially existed and a planting ridge where each of the furrows initially existed.

3 Claims, 5 Drawing Figures

STUBBLE ERADICATING IMPLEMENT

BACKGROUND OF THE INVENTION

1. Field of the Invention

The present invention relates to a stubble eradicating implement and more particularly to such an implement to plow under all stubble from a row crop while simultaneously forming a ridge for a crop subsequently to be planted.

2. Description of the Prior Art

Present types of implements require separate operations to plow under stubble and debris from an earlier crop and to furrow the earth for a subsequent row crop. Not only are such a plurality of operations expensive, but the extra time required is, of course, lost from production in agricultural areas where climatic conditions would otherwise permit immediate planting of the subsequent crop.

The time required for such a plurality of operations creates particular problems in agricultural areas in which, for control of insects, all stubble and debris from a crop, for example, cotton in California, must be plowed under by a certain date under penalty of law. If farmers start such soil preparation early enough to be certain the "plow down" date can be met, despite adverse weather conditions such as winter rains in the cotton growing areas of California which make the soil too wet for operation of agricultural equipment, the time alotted to the earlier crop must be cut short with adverse effects on production. For example, in the cotton growing areas of California it is sometimes necessary to forgo a final picking and gleaning of the earth surface for cotton dislodged during picking to be certain the "plow down" date is met.

Present methods of plowing under stubble and farming new furrows are not satisfactory even if the loss of production due to the required plurality of operations is disregarded. While disk harrowing is relatively inexpensive, a single such operation is not completely effective to tear all stubble loose from the soil and to bury the stubble and debris from the earlier crop. Thus, in areas where all stubble must be completely torn loose from the soil for insect control purposes, it is necessary to repeat such an operation to control insects and avoid legal penalties with resulting loss of time and money. Plowing can, of course, turn under the stubble and debris in one operation, but such an operation requires more "draft" than does harrowing because of the greater depth of soil which must be turned with a resulting need for more expensive equipment and a greater consumption of energy. In addition, plowing frequently leaves many large clods so that the soil surface is left in an unsatisfactory condition for subsequent furrowing and planting operations unless intervening operations are performed.

SUMMARY OF THE INVENTION

Therefore, it is an object of the present invention to provide an improved stubble eradicating implement for row crops.

Another object is to provide such an implement which in one operation completely tears loose all stubble from the soil and buries such stubble and debris from an earlier crop while simultaneously forming ridges and furrows for a subsequent crop.

Another object is to provide such an implement which in a single operation leaves the soil in excellent condition for growing of the subsequent crop.

Another object is to provide such an implement which requires relatively limited "draft" so that eradication of stubble does not require the use of other equipment which is expensive and consumes a relatively large amount of energy.

Further objects and advantages are to provide improved elements and arrangements thereof in a stubble eradicating implement which is economical, rugged, convenient to repair during agricultural operations in the field, durable, and fully effective in accomplishing its intended purposes.

DESCRIPTION OF THE PREFERRED EMBODIMENT

Figure 1:
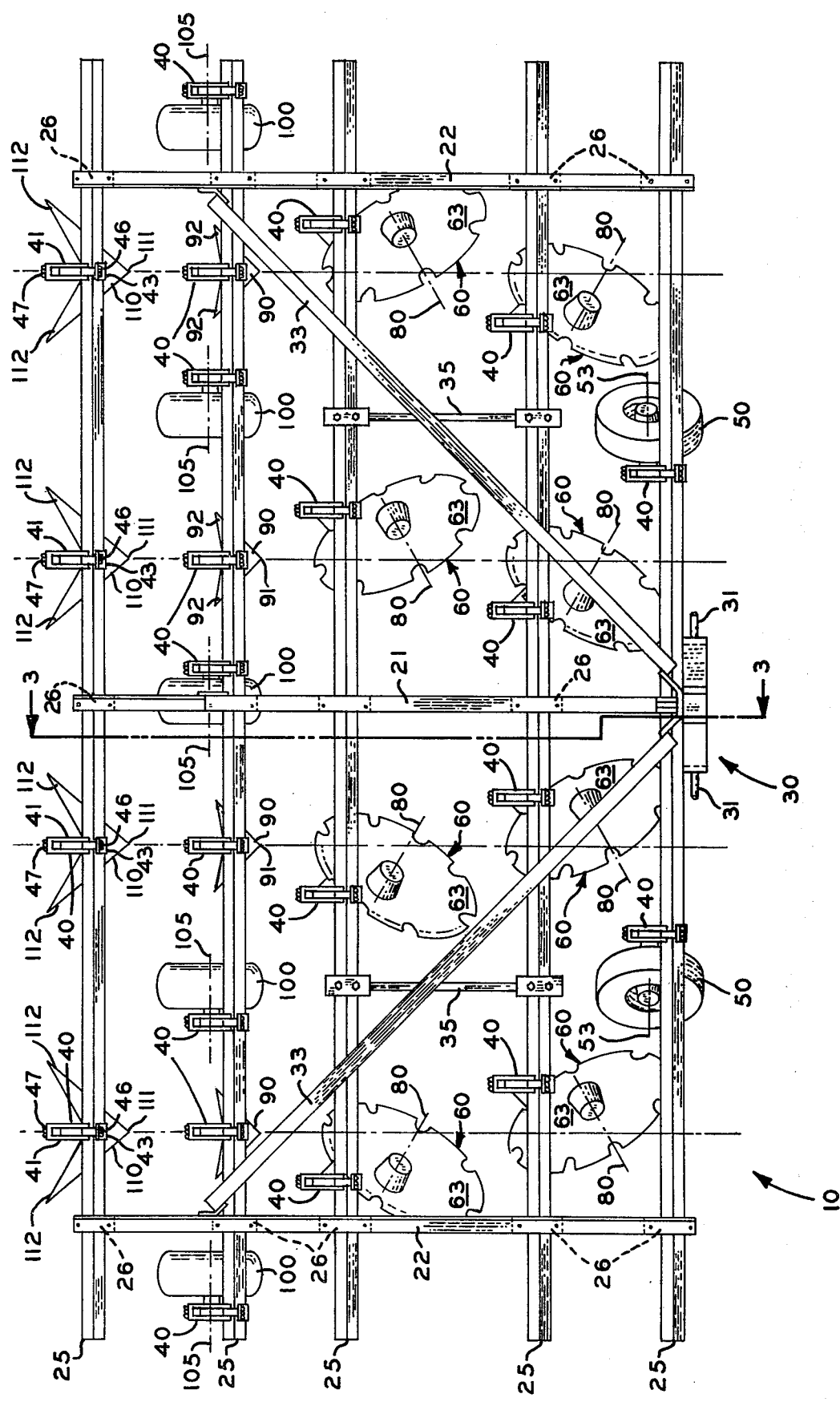
FIG. 1 is a plan view of a stubble eradicating implement embodying the principles of the present invention and adapted for operation on four rows of a row crop.
Figure 2:
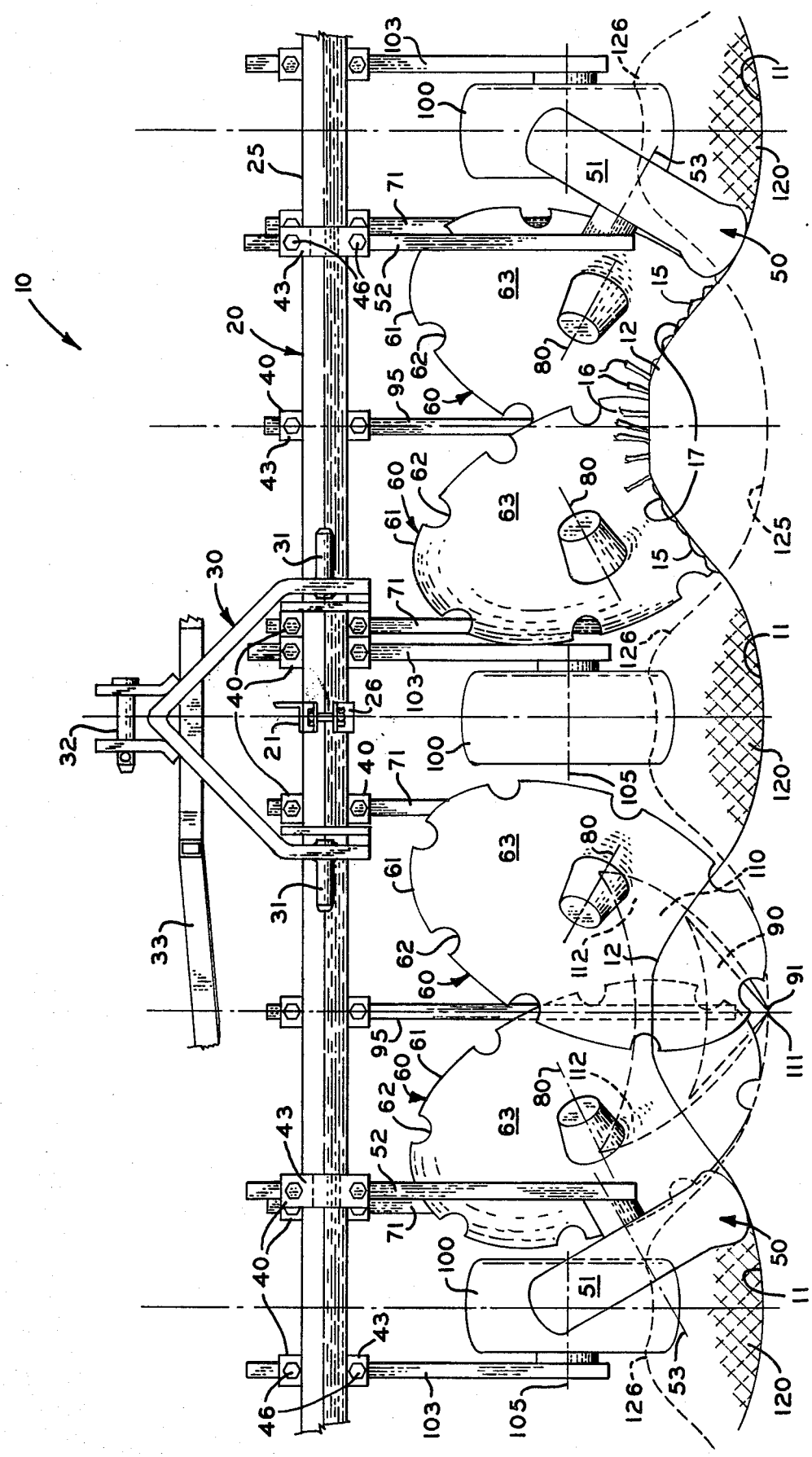
FIG. 2 is a fragmentary front elevation of the implement of FIG. 1 showing a portion of the implement with two of the rows of FIG. 1 in a soil surface having a stubble and debris disposed thereon prior to passage of the implement and with two guide wheels in alternate position as compared with FIG. 1. The soil surface subsequent to such passage is indicated by a dashed line, the position of the stubble and debris at such time is indicated by hatching. Dashed lines representing certain soil engaging elements of the implement are omitted on the right hand portion of the figure for clarity.

Referring more particularly to the drawings, in FIG. 1 is shown a stubble eradicating implement, generally indicated by the numeral 10, embodying the principles of the present invention. The implement is adapted to use on an earth surface having, as best shown in FIG. 2, a plurality of substantially parallel planting furrows 11 alternating with ridges 12. The earth surface has debris 15 thereon, and each ridge has stubble 16 centrally disposed therein. Each ridge has inclined transversely opposite sides 17.

The implement 10 has a frame, generally indicated by the numeral 20, adapted for movement in a line of travel in a predetermined longitudinal direction substantially parallel to the furrows 11 and ridges 12. As shown in FIG. 1, the frame is of grid-like form as viewed from above, having a central longitudinal bar 21 and a pair of outboard longitudinal bars 22 parallel and transversely opposite thereto and of substantially equal length therewith. Five substantially horizontally disposed tool bars 25 extend in right angular relation to the longitudinal bars and are mounted thereon in longitudinally spaced relation therealong. The tool bars are conventionally arranged, having a substantially square cross section disposed with the corners thereof directed vertically and horizontally. The tool bars are below the longitudinal bars and are secured thereto by conventional clamps 26. The tool bars are of substantially equal length and extend oppositely transversely substantially beyond the outboard longitudinal bars. The forwardmost tool bar is disposed adjacent to the forward end of the longitudinal bars 21 and 22, the rearwardmost tool bar is disposed adjacent to the rearward ends of said longitudinal bars. For illustrative convenience the frame of the implement shown in FIG. 1 extends transversely a distance such that the implement is adapted for operations, subsequently to be described, on four ridges 12 and their adjacent furrows 11. However, it is to be understood that the implement is not restricted to operations on four ridges, but, as will subsequently become apparent, can be utilized for operations on any number of ridges by employing tool bars of different lengths having appropriate numbers of elements, not yet described, mounted thereon. Since said operations of the implement on any ridge and its adjacent furrows are substantially identical, the description of the structure and operation of the preferred embodiment will, in general, relate to the elements required for one ridge and its adjacent furrows.

Figure 3:
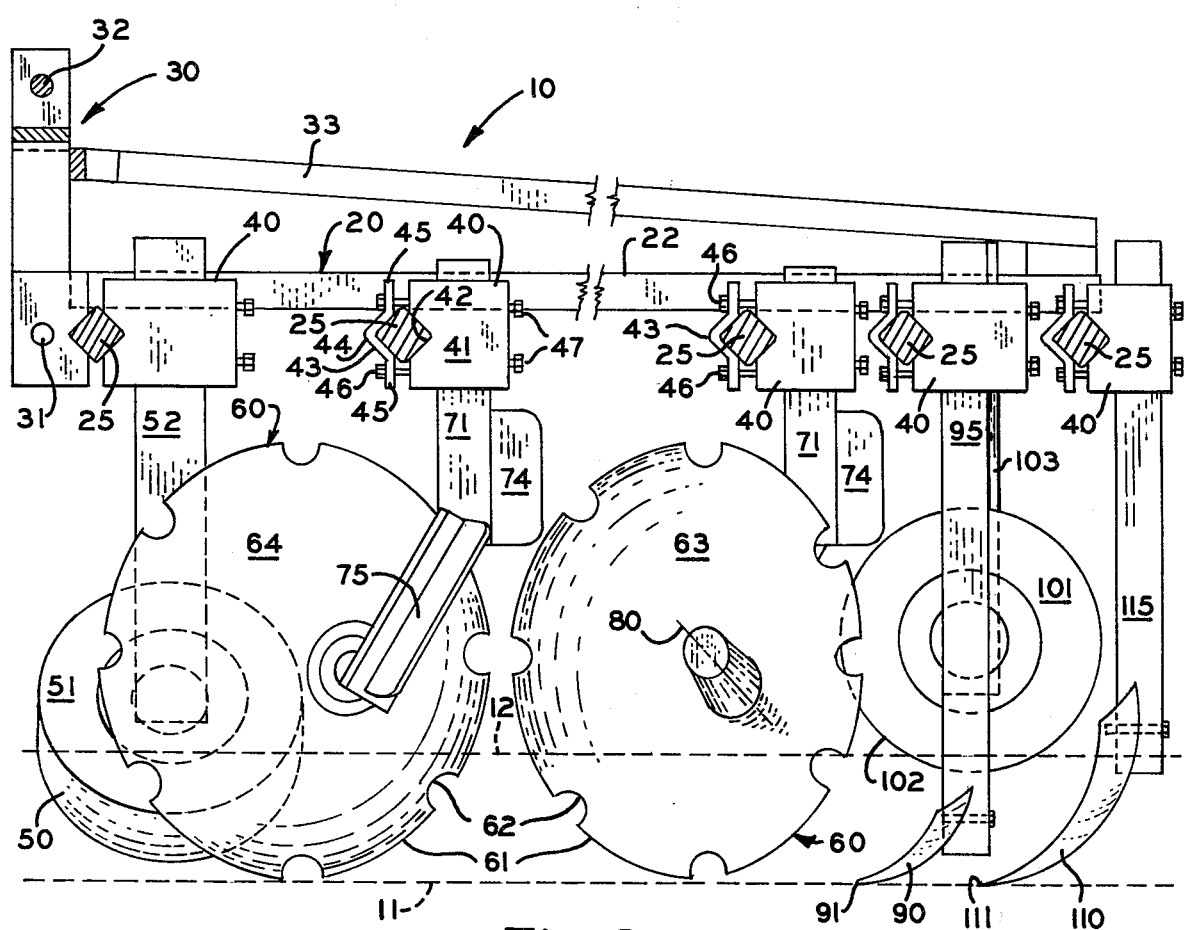
FIG. 3 is a vertical section taken on line 3—3 of FIG. 1 with frame members foreshortened for illustrative convenience and dashed lines indicating the approximate elevations of the crest of a ridge and bottom of a furrow in the soil surface.
Figure 4:
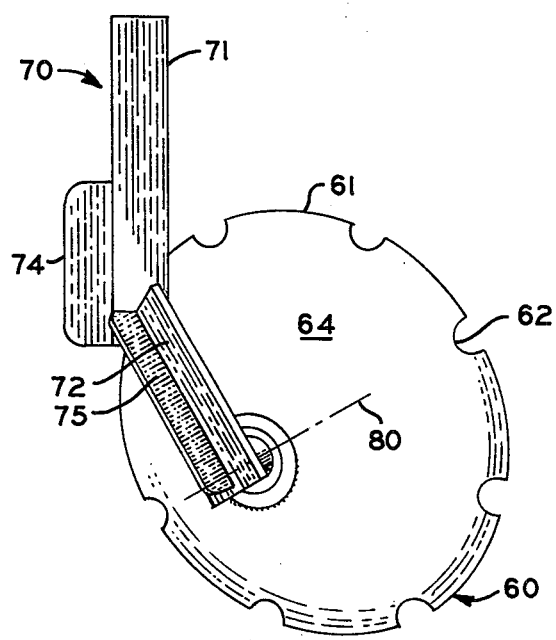
FIG. 4 is a side elevation of a mounting assembly for a disk blade used with the implement of FIG. 1.
Figure 5:
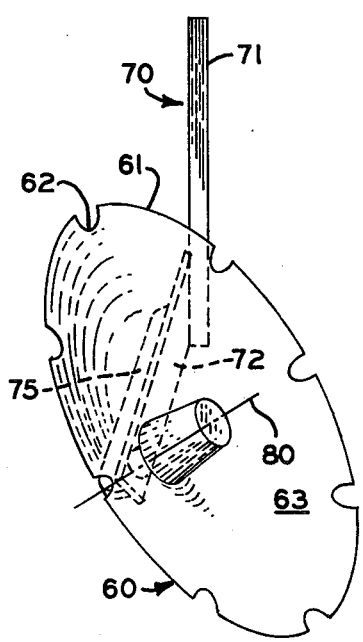
FIG. 5 is a front elevation of the mounting assembly of FIG. 4.

The frame 20 has, as best shown in FIGS. 2 and 3, a well known three point hitch indicated generally by the numeral 30 mounted centrally thereon forwardly of the forwardmost of the tool bars 25. The hitch has a downward, transversely disposed pair of mounting points 31 adjacent and secured to the forwardmost of the tool bars 25, and the hitch extends upwardly to a single, upwardly disposed mounting point 32. Three draft bars 33 individually connect the single mounting point with the rearward ends of the central longitudinal bar 21 and of the outboard longitudinal bars 22 with a tractor, not shown. A pair of longitudinal brace bars 35 connect the pair of tool bars immediately rearwardly of the forwardmost of the tool bars. The brace bars are disposed upwardly of the tool bars and oppositely transversely between the central longitudinal bar 21 and the outboard longitudinal bars 22. The stubble eradicating implement 10 can be transported to the furrows 11 and ridges 12 on which the implement is to be operated and there drawn in operation by any suitable device, such as a tractor, attached to the three point hitch.

A plurality of conventional clamps 40, best shown in FIGS. 1 and 3, connect various elements, subsequently to be described, of the implement 10 to the tool bars 25. Each clamp has a rearwardly disposed substantially rectangular box portion 41 which is elongated along the line of travel of the frame 20 and is open upwardly and downwardly for the insertion of a rectangular bar-like tool shank, to be subsequently described, therethrough in vertically sliding relation thereto. The box portion has a triangular notch 42 in the forward edge thereof dimensioned to engage the rearward edge of a tool bar, as shown in FIG. 3. Each clamp has a forwardly disposed plate-like portion 43 having a central triangular bend 44 dimensioned to engage the forward edge of a tool bar and having a pair of ears 45 extending oppositely vertically from the bend. A first pair of horizontal bolts 46 having their heads forwardly disposed extend longitudinally individually through suitable openings in the ears into screw threaded engagement with the box portion. The triangular notch 42 and triangular bend 44 are fitted to the tool bar so that the clamp is slidably mounted for transverse adjustment relative thereto. The clamp may be secured in any desired position transversely along the tool by tightening the bolts 46. A second pair of horizontal, longitudinally disposed bolts 47 have their heads rearwardly disposed and extend through and screw threadably engage the rearward edge of the box portion so that the ends of the bolts opposite the heads engage the shank of a tool extending through the box portion in clamping relation.

The implement 10 has a pair of guide wheels, indicated generally by the numeral 50, individually mounted for free rotation on the forwardmost of the tool bars 25 by one of the clamps 40 which provides for slidable transverse and vertical movement of the guide wheel relative to said tool bar and which provides for releasable positioning of the wheel as desired relative to the frame 20. Each guide wheel is, preferably, provided with a pneumatic tire 51. The clamps mounting the guide wheels are transversely oppositely disposed to the central longitudinal bar 21 above oppositely inclined sides of the ridges 12. A tool shank 52 extends downwardly through each clamp to bearings defining respective axes 53 of the guide wheels. The axes lie in a transverse vertical plane and are inclined therein so as to be substantially parallel to their respective side of a ridge as shown in FIG. 2. The periphery of each guide wheel is positioned in rolling engagement with its respective side of a ridge to support the frame vertically and to resist transverse movement thereof toward said side of a ridge.

A pair of disk blades 60 are mounted on the frame 20 in fore and aft, or longitudinally, spaced relation for each ridge 12 on which the implement 10 is to operate. Each disk blade is of conventional concavo-convex form having a circular peripheral cutting edge 61 provided with a plurality of substantially equally circumferentially spaced segmental notches 62 to increase the cutting effect of the cutting edge, a concave face 63, and an opposite convex face 64. Each pair of disk blades related to a ridge are individually mounted on the pair of tool bars 25 immediately rearwardly of the forwardmost of the tool bars by a clamp 40 which provides for slidable transverse and vertical adjustment of the disk blade relative to their respective tool bars and which provides for releasable positioning of the disk blade as desired relative to said ridge. Said pair of disk blades related to a ridge are longitudinally spaced a distance such that a portion of the debris and soil encountered is rearwardly and laterally discharged by the forwardly disposed blade to encounter the following blade while said soil and debris is still in motion.

Each disk blade 60 has a mounting assembly, indicated generally by the numeral 70, which includes a tool shank 71 extending substantially vertically downwardly through a respective clamp 40 to an elongated mounting plate 72 which is fixed, as by welding, to the shank and has opposite, forwardly and rearwardly disposed faces.

A pair of stiffening plates 74 and 75 are mounted, respectively, on the rearward edge of the shank 71 and on the rearward face of the mounting plate with the stiffening plates joined, as by welding, to the shank and to the plate at their respective forward edges. The mounting plate extends from its respective shank with the longitudinal axis of the plate extending forwardly, downwardly, and transversely to bearings mounted on the upwardly disposed face of the plate. The bearings define an axis 80 for said disk blade which extends perpendicularly to and upwardly from said face of the plate. Said disk plate is mounted for free rotation about its axis with the peripheral cutting edge 61 of said disk blade disposed away from its respective mounting plate.

The faces and longitudinal axis of the mounting plate are so inclined to their respective shank that the axis of the disk blade is inclined with respect to the horizontal, as measured in a vertical plane containing the axis, at an angle of 25° to 35° with the preferred angle being substantially 30°. Said faces and axis are also so inclined that the axis of the disk blade is forwardly convergent to the line of travel of the frame 20. The angle of such convergence between said line of travel and a vertical plane containing said axis is, as measured in a horizontal plane, 48° to 60° with the angle, preferably, being 53° to 55°. The mounting assemblies of each pair of disk blades along a ridge 12 are constructed with their respective mounting plates oppositely angularly extending transversely of the ridge and with the axes of their respective disk blades oppositely forwardly convergent to the line of travel of the frame 20 and forwardly inclined, so that the respective concave faces of said pair of disk blades are both disposed forwardly and upwardly.

The clamps 40 of each pair of disk blades 60 related to a ridge 12 are oppositely transversely disposed along their respective tool bars 25 from the center of the ridge, as shown in FIGS. 1 and 2, so that the lowest points on the peripheral cutting edges 61 of said blades are adjacent to the center of the ridge and the disk blades overlap transversely of the ridge. The tool shanks 71 of the mounting assemblies 70 of each of the disk blades are vertically positioned in their respective clamps 40 so that the lowest points of the peripheral cutting edges of th disk blades are at an elevation near but above the elevation of the bottom furrow 11 or at any other elevation desired.

The implement 10 has a plurality of first furrowing shovels 90 individually related to the ridges 12 on which the implement is to operate. Each first furrowing shovel has a central tip 91 at the lowest and forwardmost point thereof and has opposite curved wings 92 extending rearwardly and upwardly from the tip and individually diverging oppositely transversely therefrom. Each first furrowing shovel is mounted on the frame 20 by a substantially vertical tool shank 95 which extends upwardly from a rearwardly and centrally disposed portion of the furrowing shovel through one of the clamps 40. Said clamp is mounted on the next to the rearwardmost of the tool bars 25 so that the tip of the furrowing shovel is forwardly disposed from the tool bar on which the shovel is mounted and rearwardly disposed from the rearwardly disposed disk blades 60 of the pairs of disk blades for each ridge. Each clamp mounting a first furrowing shovel is transversely disposed on its respective tool bar so that the tip of said furrowing shovel is elevationally positioned lower than the bottoms of the disk blades 60 but higher than the bottom of a furrow 11.

The implement 10 has a plurality of rollers 100 equal in number to the number of ridges 12 on which the implement is to operate plus one. The rollers, preferably, have pneumatic tires 101 having generally cylindrical peripheries 102, as shown in FIGS. 2 and 3, having a width approximately one sixth of the transverse distance between the center of the ridges 12. Each roller has a substantially vertical tool shank 103 axially adjacent thereto. Said tool shank has a lower end provided with bearings defining a substantially horizontal and transversely extending axis 105, about which the roller is mounted for free rotation. Each tool shank 103 extends upwardly through a respective clamp 40 mounted on the next to the rearwardmost of the tool bars 25 of the frame 20 so that the axes of the rollers are rearwardly disposed from the tips 91 of the first furrowing shovels 90 and are longitudinally approximately aligned with the rearward ends of the wings 92, as shown in FIG. 2. Said clamps are transversely substantially equally spaced along said tool bar, as best shown in FIG. 1, so that the centers of the peripheries of the rollers are transversely substantially aligned with the centers of the furrows 11 adjacent to the ridges on which the implement is to operate. Each shank 103 is vertically positioned in its respective clamp so that the lowermost portion of the periphery of the tire 101 is elevationally positioned somewhat below the crests of the ridges.

The implement 10 has a plurality of second furrowing shovels 110 individually related to the ridges 12 on which the implement is to operate. The second furrowing shovels are similar to the first furrowing shovels, each having a forwardly and downwardly disposed central tip 111 and opposite wings 112 diverging oppositely transversely and upwardly therefrom and having a tool shank 115 extending substantially vertically therefrom through a respective clamp 40. Each second furrowing shovel is transversely positioned similarly to the first furrowing shovel corresponding to the same ridge in that the tip of said second furrowing shovel is substantially aligned with the center of its respective ridge and is similarly elevationally positioned with the tip 111 substantially at the same elevation as the bottom of a furrow 11. However, the wings 112 of the second furrowing shovels extend upwardly and transversely substantially beyond the wings 92 of the first furrowing shovel, and the shanks 115 of the second furrowing shovels extend upwardly through individual clamps 40 mounted on the rearwardmost of the tool bars 25 so that the tips 111 of the second furrowing shovels are disposed rearwardly of the first furrowing shovels and of the axes 105 of the rollers 100.

A disposition of material from the ridge 12 while the axis 105 of the roller 100 of the implement 10 is passing over the earth surface is shown in FIG. 1 in which debris, stubble, and soil 120, indicated by hatching, have been deposited into a furrow 11 by the disk blades 60. The roller 100 is shown in compacting rolling engagement with the debris, stubble, and soil 120. The earth surface subsequent to the passage of the second furrowing shovels 110 is characterized by substantially parallel new furrows 125 transversely positioned were the ridges 12 were positioned before passage of the stubble eradicating implement. The new furrows alternate with elevated seed beds or new ridges 126 transversely positioned where the furrows 11 were positioned prior to passage of the implement.

OPERATION

The operation of the described embodiment of the present invention is believed to be clearly apparent and is briefly summarized at this point. As best shown in FIG. 2, when the implement of the present invention is most frequently used, the earth surface has furrows 11 and ridges 12 from a prior planting. Debris 15 and stubble 16 are disposed on the ridges and there frequently is debris in the furrows as well. The stubble and debris may be the result of a previous shredding operation, such as is commonly performed in cotton fields in California after picking is completed.

The implement is transported in any suitable manner, as by the three point hitch 30, to a field of operation.

Before operating the implement, the earth engaging elements of the implement, the guide wheels 50, disk blades 60, first furrowing shovels 90, rollers 100, and second furrowing shovels 110, are transversely and elevationally positioned on their respective tool bars 25. These elements are transversely positioned by loosening the forward bolts 46 of the clamps 40, sliding the clamps together with the connected elements to their previously described positions, best shown in FIG. 2, relative to the furrows and ridges, and securing the clamps in such positions by tightening the bolts 46. These elements are elevationally positioned by loosening the rearwardly disposed bolts 47 of their respective clamps 40, sliding their respective tool shanks up or down until said elements are elevationally suitably disposed, and clamping the elements by tightening the bolts 47. As shown, the disk blades 60 are overlapped when viewed in the line of travel and elevationally adjusted so as to uproot the stubble 16. The guide wheels are positioned so as to ride on their respective ridges 12. The furrowing shovels 90 and 110 are aligned with their respective ridges, or expressed differently, are positioned to travel in the furrows made by the disk blades 60. The first shovels are preferably a little lower than the blades 60 but not quite as low as the second shovels 110. The second shovels are preferably about as deep as the furrows 11 or slightly deeper. The rollers 100 are aligned with the furrows 11 and elevationally positioned to roll on, and compact, stubble, debris and earth deposited therein.

To operate the implement 10, it is first raised by the hitch 30, transversely aligned with the furrows 11 and ridges 12 as best shown in FIG. 1, and lowered into engagement with the earth surface, where the implement is supported by the guide wheels 50 and the rollers 100, and is drawn along such ridges and furrows by the hitch 30.

As the implement moves along the ridges and furrows it is urged into proper transverse alignment relative thereto by the guide wheels which engage oppositely sloping sides 17 of the substantially parallel ridges. The forces required to draw the earth engaging element of the implement on or through the earth surface are transversely balanced because the pair of furrowing shovels 90 and 110 related to a ridge are substantially symetrically disposed about the center line of the ridge, and the pair of disk blades 60 related to a ridge have their axes 80 oppositely converging. As a result, excessive force need not be exerted by the guide wheels to keep the implement properly transversely aligned with the ridges. Such forces are further balanced by transversely positioning the earth engaging elements of the implement so that the ridges on which the implement is to operate are equally spaced oppositely laterally of the central longitudinal bar 21 of the frame 20. When not in stubble eradicating operation, as when moving to different ridges, the implement may be raised in the coventional manner from engagement with the earth surface by the three point hitch.

The overall operation of the implement 10 having been described, attention is invited to the stubble eradicating action of the earth engaging elements related to individual ridges 12 and the furrows 11 adjacent thereto.

As the implement 10 moves in normal stubble eradicating operation, each location along a ridge 12 is first engaged by a forwardmost disk blade 60. Disk blades normally are employed in erect planes angularly related to their direction of travel. So disposed, they slice, then turn or roll the earth, with an effect somewhat akin to that of a plow, which they are sometimes called. The novel disposition of the blades 60 in the present invention causes the blades to operate significantly differently and to achieve a most salutory stubble eradicating result. Because of the forward inclination of the axes of the blades, or the consequent rearward tipping of the planes of the blades, they have an initial scooping effect, slicing under and uprooting the stubble 16. Rearward drag on the bottoms of the blades as the implement 10 moves forwardly rotates the blades about their forwardly convergent axes. Earth, stubble and debris are carried rearwardly on the blades until the inclination of the blades is sufficiently precipitous that they can no longer travel with the blades at which point the scooped earth, stubble and debris are discharged in a thoroughly mixing tumbling action. It will be observed that the companion blades are disposed on opposite sides of a line of travel centered on their respective ridge 12. However, their peripheries extend transversely beyond their respective center line of travel. Thus, the front blade of each pair of blades 60, tumbles its earth, stubble and debris across the center line of travel into a berm parallel thereto. The following disk blade scoops up earth, stubble and debris and tumbles such material oppositely across said center line of travel into a berm. The berms are thus formed in the furrows 11 and after the passage of the disk blades, such berms define a new furrow where the original ridge 12 initially existed.

The described movement of the stubble, debris and soil is materially assisted by the rotation of the blades which, since they substantially recline, transport such material on their upper, concave surfaces in a rolling movement from the ridge over the adjacent furrow and casts it therein as indicated by the numeral 120. A portion of said material from the ridge is cast substantially beyond the center of the furrow from said ridge. Such movement of stubble, debris, and soil is materially added by the relatively close fore and aft spacing of said pair of disk blades because clumps of stubble, soil and debris are rolled somewhat laterally by the forwardmost disk blade and thrown therefrom to engage the forward edge of the following blade to be broken up and rolled oppositely laterally of the ridge. Since said pair of disk blades overlap transversely, all of the stubble disposed in a ridge is transferred into the adjacent furrows along with the debris encountered by the overlapping disk blades and with a substantial portion of the soil of the ridge so, as previously described, a new furrow 125 is partially formed centrally along the line of the ridge.

As the implement 10 continues to move in normal stubble eradicating operation after subjecting each location along a ridge 12 to the action of the disk blades 60, each location is subsequently engaged by the first furrowing shovel 90 which removes additional soil from the ridge to form the central bottom portion of a new furrow 125. The soil removed by the first furrowing shovel is discharged opposite laterally onto the stubble, debris, and soil 120 deposited in the furrow 11 by the disk blades 60, as shown in FIG. 2. During the period in which each location along the ridge is engaged by the first furrowing shovel, the stubble, soil, and debris 120 in the furrow 11 rearwardly adjacent to the location is engaged and compacted by a rolling action of the rollers 100. As the implement continues in normal stubble eradicating operation subsequently to the action of the first furrowing shovel and the rollers, each location along the ridge is engaged by a second furrowing shovel 110 which completes formation of a new furrow 125 along the center line of the ridge 12 by removing the remaining soil from said ridge and discharging the soil oppositely laterally onto the stubble, soil, and debris compacted by the roller so that said stubble, soil, and debris is buried. Sufficient soil is so removed from the ridge and discharged laterally that the soil discharged by adjacent second furrowing shovels forms an elevated seed bed or new ridge 126 for a crop subsequently to be planted.

Although the invention has been herein shown and described in what is conceived to be the most practical and preferred embodiment, it is recognized that departures may be made therefrom within the scope of the invention, which is not to be limited to the illustrative details disclosed.

Having described my invention what I claim as new and desire to secure by Letters Patent is:

1. An implement for use on an earth surface having a ridge with debris including stubble disposed thereon and debris receiving furrows along opposite sides of the ridge, comprising:
   (A) a frame;
   (B) means mounting the frame for travel along the ridge;
   (C) a pair of concavo-convex disk blades each concentric to a respective axis and each having a peripheral cutting edge;
   (D) means mounting the blades for free rotation about their respective axes in fore and aft spaced relation along the ridge on opposite sides thereof, the axes being disposed in respective vertical planes substantially equally and oppositely angularly forwardly convergent with the ridge at from approximately 48° to 60° and said axes being forwardly inclined in their respective planes at from approximately 25° to 35° with their concave sides forwardly and upwardly disposed to scoop up debris and soil and deposit them in the furrows, said disk blades overlapping transversely of the ridge and having lowermost points adjacent to the center of the ridge and being in sufficient proximity that soil and debris encountered by the forwardmost blade are scooped up and rolled laterally in one direction where while still moving they encounter the forward edge of the following blade and in part are scooped up and rolled oppositely laterally of the ridge;
   (E) a first furrowing shovel mounted on the frame in following relation to the blades and in alignment therewith to form a first furrow along the ridge and to discharge soil oppositely laterally onto the debris and soil in the furrows;
   (F) a roller mounted on the frame rearwardly of the first shovel in alignment with each furrow for compacting rolling engagement with debris and soil deposited therein; and
   (G) a second furrowing shovel mounted on the frame rearwardly of the first furrowing shovel and in alignment with the disk blades to form a furrow along the ridge and to discharge soil oppositely laterally onto the compacted debris and soil in the furrows to form an elevated seed bed therealong.

2. The implement of claim 1 for use with such a ridge having a side which is inclined transversely of the ridge, wherein said means for supporting the frame includes a guide wheel mounted on the frame forwardly of said pair of disk blades in rolling engagement with said side of the ridge with the axis of said guide wheel substantially parallel to said side of the ridge.

3. The implement of claim 2 in which the means mounting the blades, the first furrowing shovel, the roller, the second furrowing shovel, and the guide wheels are slidably mounted on the frame for movement laterally of the ridge and are releasably clamped on the frame for alignment with said ridge and furrows of laterally varying widths.

* * * * *